E. S. FARSON.
FILTER.
No. 103,592. Patented May 31, 1870.
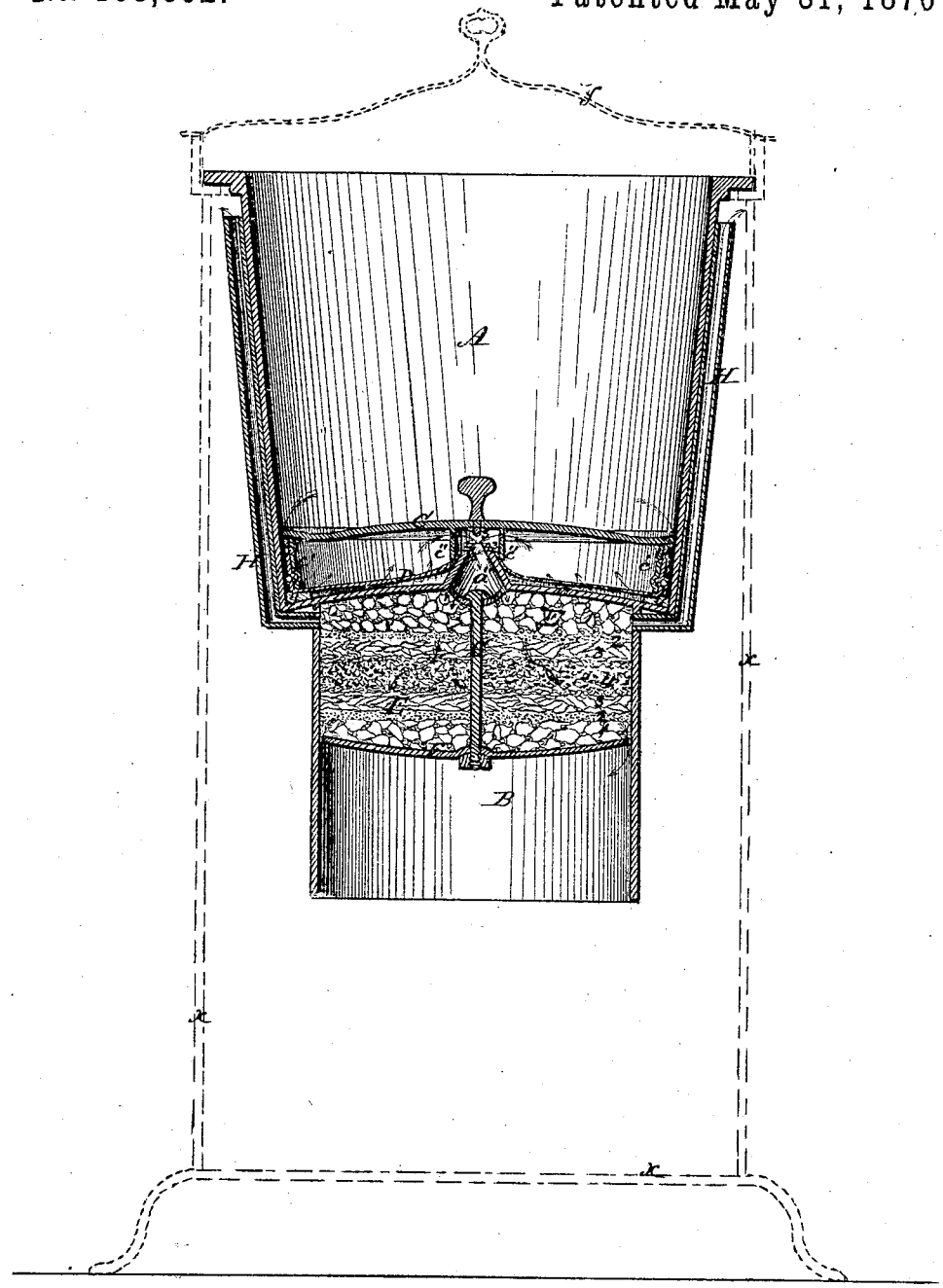

United States Patent Office.

ENOCH S. FARSON, OF PHILADELPHIA, PENNSYLVANIA.

Letters Patent No. 103,592, dated May 31, 1870. *Antedated May 17/70.*

IMPROVEMENT IN FILTERS.

The Schedule referred to in these Letters Patent and making part of the same.

I, ENOCH S. FARSON, of the city of Philadelphia, in the State of Pennsylvania, have invented certain Improvements in Water-Filters, of which the following is a specification.

Nature and Objects of the Invention.

The first part of my invention relates to the construction, arrangement, and combination of an upper vessel for receiving the ice and water to be filtered, a lower one for holding the filtering substances and discharging the water as filtered, and a perforated conical cap attached over a series of perforations in the middle of the bottom of the upper vessel, the object of this part of my invention being to adapt the said two connected vessels for the application and removal with ready facility, of a strainer above and certain filtering substances below the said bottom, as will hereinafter be described.

The second part of my invention relates to the combination with the under side of the said bottom of the upper vessel of an adjustable disk and a nutted-screw-bolt, in such a manner that certain strata of gravel, sand, and charcoal, or other suitable filtering substances, can be firmly supported up against the said bottom, and, at the same time, leave a narrow annular space between the said disk and the sides of the lower vessel, the object of this part of my invention being to enable the attendant to cleanse, remove, or renew the said filtering substances with facility, as occasion may require, and to cause the water, in filtering or percolating through the same, to pass from the perforations in the middle of the bottom of the upper vessel toward the annular space around the disk, and be discharged from the latter in a perfectly filtered condition.

The third part of my invention relates to the construction and application over the perforated bottom and conical cap of a readily removable and adjustable strainer, consisting of a diaphragm, provided, on its under side, with an imperforate outer flange around near its perimeter, a perforated annular flange around near its center, and either a flexible straining-cloth, with a small hole in its center, or a sheet-metal disk, perforated by a series of minute holes around near its perimeter, and a small expansible hole in its center, in such a manner that, when the said complicate strainer is applied on the bottom of the upper vessel, the hole in the center of the straining-cloth or disk will fit water-tight around the base of the perforated conical cap, while the outer flange will rest upon low supports, which will allow the water above to pass down under the said outer flange, thence through the straining-cloth or disk and the perforated inner flange, and, finally, through the perforated conical cap to the filtering strata below the said bottom, the object of this part of my invention being twofold, first, to prevent any coarse substances in the water from entering the perforated conical cap, and, second, to allow the whole complicate strainer to be freely lifted out of the upper vessel for washing or cleansing either the vessel or strainer, or both, as occasion may require.

Description of the Accompanying Drawings.

A is the larger or upper vessel;
B, the smaller or lower vessel;
C, the metallic diaphragm;
$c'$ and $c''$, its flanges;
D, the straining-cloth;
$a'$, the bottom of the vessel A;
$a''$, the perforated conical cap;
F, the dish upon which the filtering materials, E, rest;
G, the nutted bolt which sustains the dish F; and
H H, the air-tubes.

General Description.

The sides of the vessels A and B may be made of suitable sheet metal, but the bottom $a'$ of the upper vessel A, with its conical cap $a''$, the diaphragm C with its flanges $c'$ $c''$, and the dish or disk F, should each be made strong and stiff, say, of cast-iron coated with zinc or tin.

The straining-cloth D may be made of flannel, felt, or any other similar flexible porous material, and in such a manner that it may be slipped tightly over the lower edge of the flange $c'$. Or, if preferred, a sheet-metal disk, perforated with shall holes around near its perimeter, and fitted with a small expansible hole or collar in its center, which will fit water-tight around the base of the conical cap $a''$, when applied thereover in the same manner as the cloth.

The annular space between the inner and the outer flanges $c'$ $c''$ may be filled with sand or not, as may be considered preferable.

The central flange $c''$ is annular and concentric, but is only about half the length of the outer flange $c'$, so that, when the diaphragm C, with its straining-cloth D attached, is placed upon the bottom of the vessel A, the annular central flange $c''$ will press the perforated middle part of the cloth D tightly down around the conical cap $a''$, at a short distance below the perforations 3 3 3, in its upper end, while the lower edge of the outer flange $c'$ rests upon three or four low supports, 4 4, on the bottom $a'$, so as to allow the water to pass down around the flange and under the cloth D on its edge, and thence upward through the cloth to the perforations 3 3 3 in the conical cap $a''$.

The dish F is supported by the nutted bolt G, so as to retain the filtering materials E in the upper part of the lower vessel B, and so that the said materials can be "tightened up" in case of any wastage of the same.

The filtering materials consist, first, of coarse and fine gravel; second, sand; third, coarse charcoal; fourth, fine charcoal and fine gravel, mixed, in layers arranged in the order named, from the top to the middle of the mass G, and then in a reversed order from the middle to the bottom, substantially as represented in the drawing.

The air-tubes H H communicate with the interior of the upper end of the vessel B, and, extending upward along on the outside of the vessel A, open a little way below the supporting-ring 5 of the said vessel.

The whole filter is intended to be suspended in a water-retaining vessel, and covered, substantially as indicated by the dotted lines $x$ and $y$.

The water to be filtered having been placed in the vessel A, it gradually passes through the filter in the directions of the arrows marked therein on the drawing, and thus finally percolates into the retaining-vessel in the purified and transparent condition required.

I have tested these filters with water taken from the gutters of the streets, with water containing coal-tar, and with soap-suds, and in each instance found that, after the water had passed through the filter, it was perfectly clear and bright, and free from any smell or taste of either the soap, coal-tar, or any other impurity, and I also found that, by taking out the diaphragm, turning the filter bottom upward, and passing clean water copiously through it for a few minutes, all the deposits or fecula arrested during the said experiments by the filtering materials E were discharged by the said reversed current, hence a renewal of the filtering materials E need not be made until the charcoal has lost its depuratory power, or, say, not oftener than two or three times a year.

Claims.

I claim as my invention—

1. The perforated conical cap $a''$, the depressed foraminous center in the bottom $a'$ of the vessel A, the nutted screw-bolt G, the concave dish F, upon which the filtering materials E rest, and the air-tubes H H, the said parts being arranged and applied to operate in combination with the vessels A and B, as and for the purposes hereinbefore set forth.

2. The removable cover C, with its imperforate outer flange $c'$ and perforated inner flange $c''$, in combination with the detachable strainer D, the said parts being constructed and arranged together so that, when the cover is applied over the bottom $a'$ of the vessel A, as described, the expansible material around the hole in the center of the strainer D will be pressed down water-tight around the base of the perforated conical cap $a''$, and thus cause the water in the vessel A to pass upward through the said strainer before it can reach the perforations in the said conical cap $a''$, as and for the purpose hereinbefore set forth.

ENOCH S. FARSON.

Witnesses:
BENJ. MORISON,
WM. H. MORISON.